(12) United States Patent
Lan

(10) Patent No.: US 7,441,794 B2
(45) Date of Patent: Oct. 28, 2008

(54) FOLDABLE STROLLER

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 575 days.

(21) Appl. No.: 11/235,466

(22) Filed: Sep. 26, 2005

(65) Prior Publication Data

US 2007/0069504 A1    Mar. 29, 2007

(51) Int. Cl.
*B62B 3/02*    (2006.01)
(52) U.S. Cl. .................... 280/642; 280/47.38; 280/647; 280/650
(58) Field of Classification Search .............. 280/47.38, 280/47.39, 47.4, 47.41, 642, 643, 647, 648, 280/650, 657, 658
See application file for complete search history.

(56) References Cited

U.S. PATENT DOCUMENTS

| | | | |
|---|---|---|---|
| 632,671 A | 9/1899 | Burghardt et al. | |
| 1,190,398 A | 7/1916 | Gates | |
| 1,190,399 A | 7/1916 | Gates | |
| 1,208,109 A | 12/1916 | Decker | |
| 1,407,235 A | 2/1922 | Taylor | |
| 2,745,673 A | 5/1956 | Koepke et al. | |
| 2,767,996 A | 10/1956 | Seyforth | |
| 4,448,434 A | 5/1984 | Anderson | |
| 4,544,178 A * | 10/1985 | Al-Sheikh et al. | 280/642 |
| 4,570,956 A | 2/1986 | Dyer | |
| 5,069,474 A * | 12/1991 | Tai | 280/658 |
| 5,149,115 A | 9/1992 | Sampedro | |
| 5,403,022 A | 4/1995 | Snider | |
| 5,845,925 A * | 12/1998 | Huang | 280/642 |
| 6,086,310 A | 7/2000 | Lujan, III et al. | |
| 6,102,432 A * | 8/2000 | Cheng | 280/642 |
| 6,367,821 B2 | 4/2002 | Thiele | |
| 7,077,420 B1 * | 7/2006 | Santoski | 280/642 |
| 2004/0075229 A1 | 4/2004 | Huntley | |

OTHER PUBLICATIONS

U.S. Appl. No. 11/233,272, filed Sep. 22, 2005, entitled "Wheel-Mounting Assembly for a Stroller" by Red Lan, 26 pages.

* cited by examiner

*Primary Examiner*—Christopher Ellis
*Assistant Examiner*—John D Walters
(74) *Attorney, Agent, or Firm*—Ladas & Parry, LLP

(57) ABSTRACT

A foldable stroller includes: a foldable frame having two pivot axles, two opposite lower rods, and two opposite upper rods pivoted to the lower rods through the pivot axles, respectively; a carrier disposed between the pivot axles and including two opposite connecting parts pivoted to the frame through the pivot axles, respectively, and formed with respective first and second arcuate grooves having a respective curvature center coincident with the respective pivot axle; and two limiting units, each of which includes first and second studs that project respectively from a respective one of the lower rods and a respective one of the upper rods into the first and second arcuate grooves of a respective one of the connecting parts.

5 Claims, 6 Drawing Sheets

FOLDABLE STROLLER

BACKGROUND OF THE INVENTION

1. Field of the Invention

The present invention relates to a foldable stroller, more particularly to a foldable stroller with a carrier that is rotatable relative to a frame of the foldable stroller.

2. Description of the Related Art

U.S. Pat. No. 5,921,574 discloses a perambulator that comprises a foldable frame provided with wheels, and a carrying element connectable to the frame for carrying a child. The frame includes a substantially horizontally extending undercarriage, and a pushing element connected to the undercarriage and including a pair of opposite rods. The carrying element has a sub-frame that is secured to the rods of the pushing element through two fixation constructions and that can be released from the fixation constructions, so as to be rotatable relative to the rods through operation of a button provided on one of the rods and a lever on the other of the rods.

The aforesaid perambulator is disadvantageous in that the fixation constructions are relatively complicated, and folding and extending of the frame through operation of the button and the lever are relatively inconvenient.

SUMMARY OF THE INVENTION

Therefore, the object of the present invention is to provide a foldable stroller that is capable of overcoming the aforesaid drawbacks associated with the prior art.

According to this invention, there is provided a foldable stroller that comprises: a wheeled foldable frame having a pair of pivot axles, a pair of opposite lower rods, and a pair of opposite upper rods that are pivoted to the lower rods through the pivot axles, respectively, so as to permit folding of the frame; a pair of locking units, each of which includes first and second interlocking members that are provided on the frame and that are releasably engageable with each other so as to lock the upper rods against rotation relative to the lower rods; a carrier disposed between the pivot axles and including a pair of opposite connecting parts that are pivoted to the frame through the pivot axles, respectively, each of the connecting parts being formed with first and second arcuate grooves having a respective curvature center coincident with a respective one of the pivot axles; and a pair of limiting units, each of which includes first and second studs that project respectively from a respective one of the lower rods and a respective one of the upper rods into the first and second arcuate grooves of a respective one of the connecting parts.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
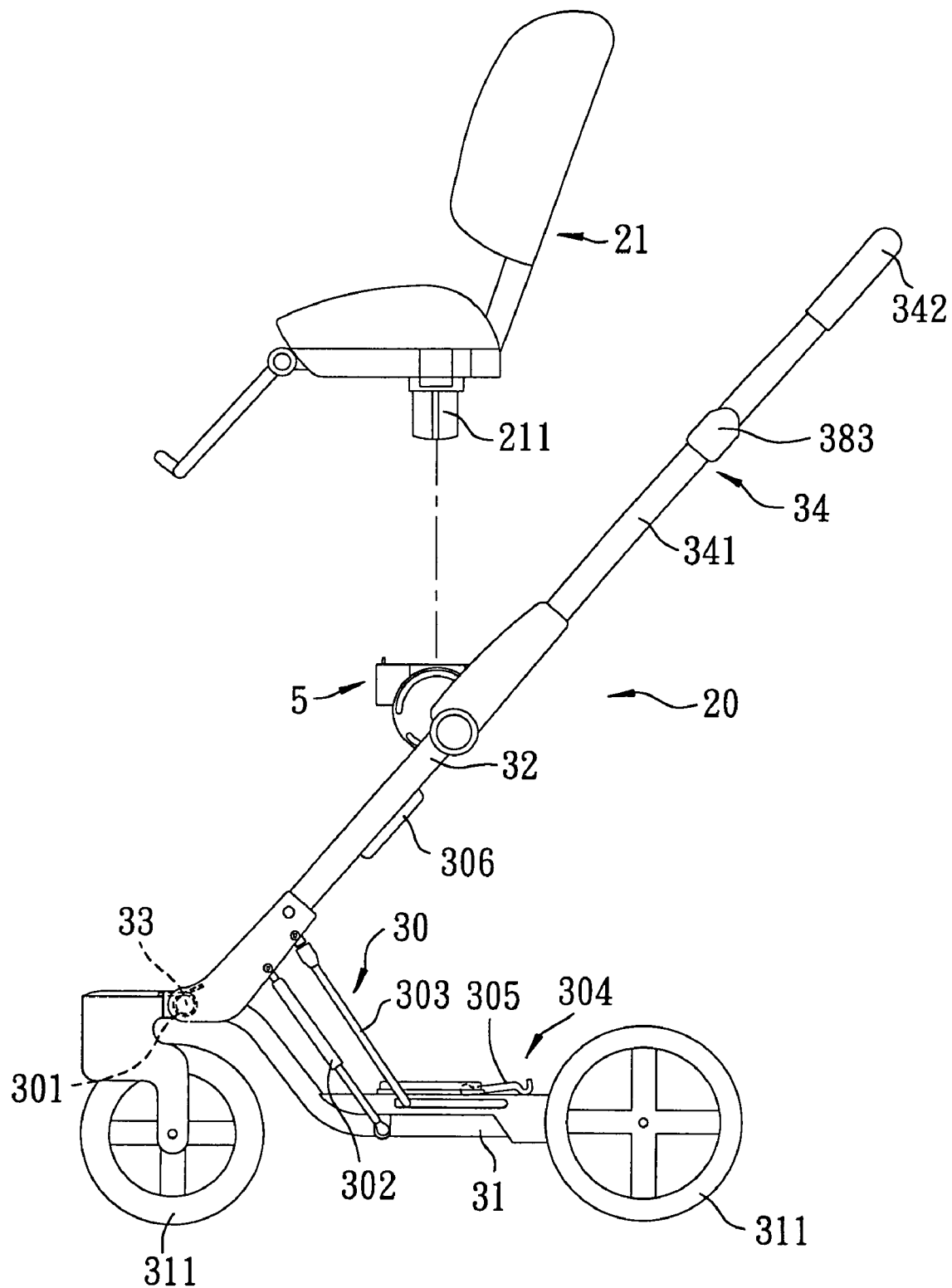
FIG. 1 is a schematic view of the preferred embodiment of a foldable stroller according to the present invention, illustrating how a seat can be detachably mounted on a carrier of the foldable stroller.
Figure 2:
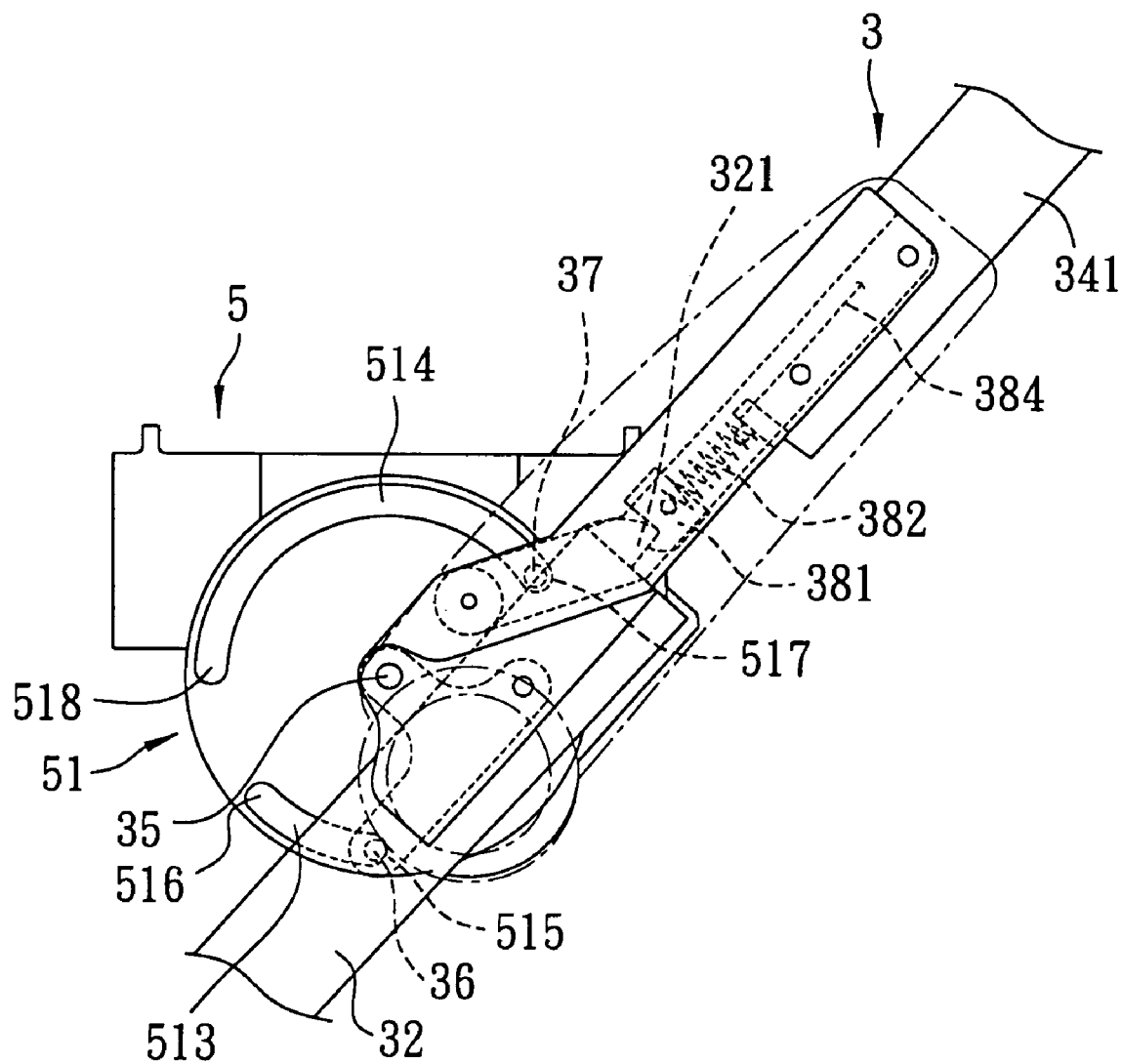
FIG. 2 is a fragmentary schematic view illustrating a state where upper and lower rods of the preferred embodiment are disposed at an extended position and are locked against relative movement through a locking unit, and where a carrier is limited by two studs against rotation relative to the upper and lower rods in a first direction.
Figure 3:
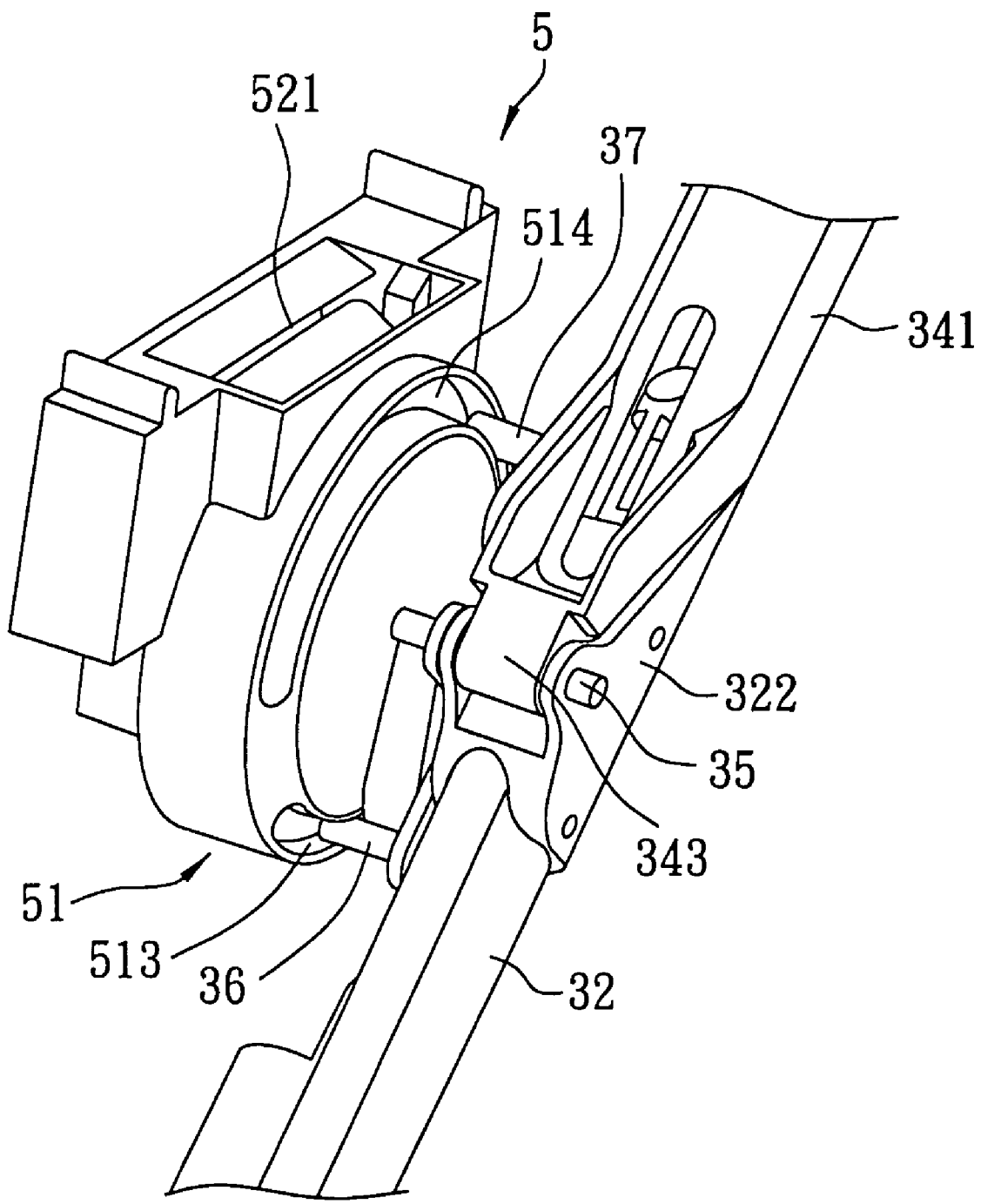
FIG. 3 is a fragmentary perspective view of the preferred embodiment disposed at the state shown in FIG. 2.

Referring to FIGS. 1, 2 and 3, the preferred embodiment of a foldable stroller according to the present invention is shown to include: a wheeled foldable frame 20 (for the sake of simplicity, only one side of the frame 20 is shown in FIGS. 1 to 3) having a plurality of wheels 311 provided thereon, a pair of pivot axles 35, a pair of opposite lower rods 32, and a pair of opposite upper rods 341 that are pivoted to the lower rods 32 through the pivot axles 35, respectively, so as to permit folding of the frame 20; a pair of locking units, each of which includes first and second interlocking members 321, 381 that are provided on the frame 20 and that are releasably engageable with each other so as to lock the upper rods 341 against rotation relative to the lower rods 32; a carrier 5 disposed between the pivot axles 35 and including a pair of opposite connecting parts 51 that are pivoted to the frame 20 through the pivot axles 35, respectively, each of the connecting parts 51 being formed with first and second arcuate grooves 513, 514 having a respective curvature center coincident with a respective one of the pivot axles 35; and a pair of limiting units, each of which includes first and second studs 36, 37 that project respectively from a respective one of the lower rods 32 and a respective one of the upper rods 341 into the first and second arcuate grooves 513, 514 of a respective one of the connecting parts 51.

In this embodiment, referring again to FIG. 2, each of the first and second arcuate grooves 513, 514 is defined by a groove-defining wall that has opposite first and second ends 515, 516 (517, 518). The first stud 36 contacts the first end 515 of the groove-defining wall of the first arcuate groove 513 so as to limit the carrier 5 against rotation relative to the upper and lower rods 341, 32 in a first direction, and the second stud 37 contacts the first end 517 of the groove-defining wall of the second arcuate groove 514 so as to limit the carrier 5 against rotation relative to the upper and lower rods 341, 32 in a second direction opposite to the first direction when the frame 20 is disposed at an extended state, as best shown in FIG. 1.

Figure 6:
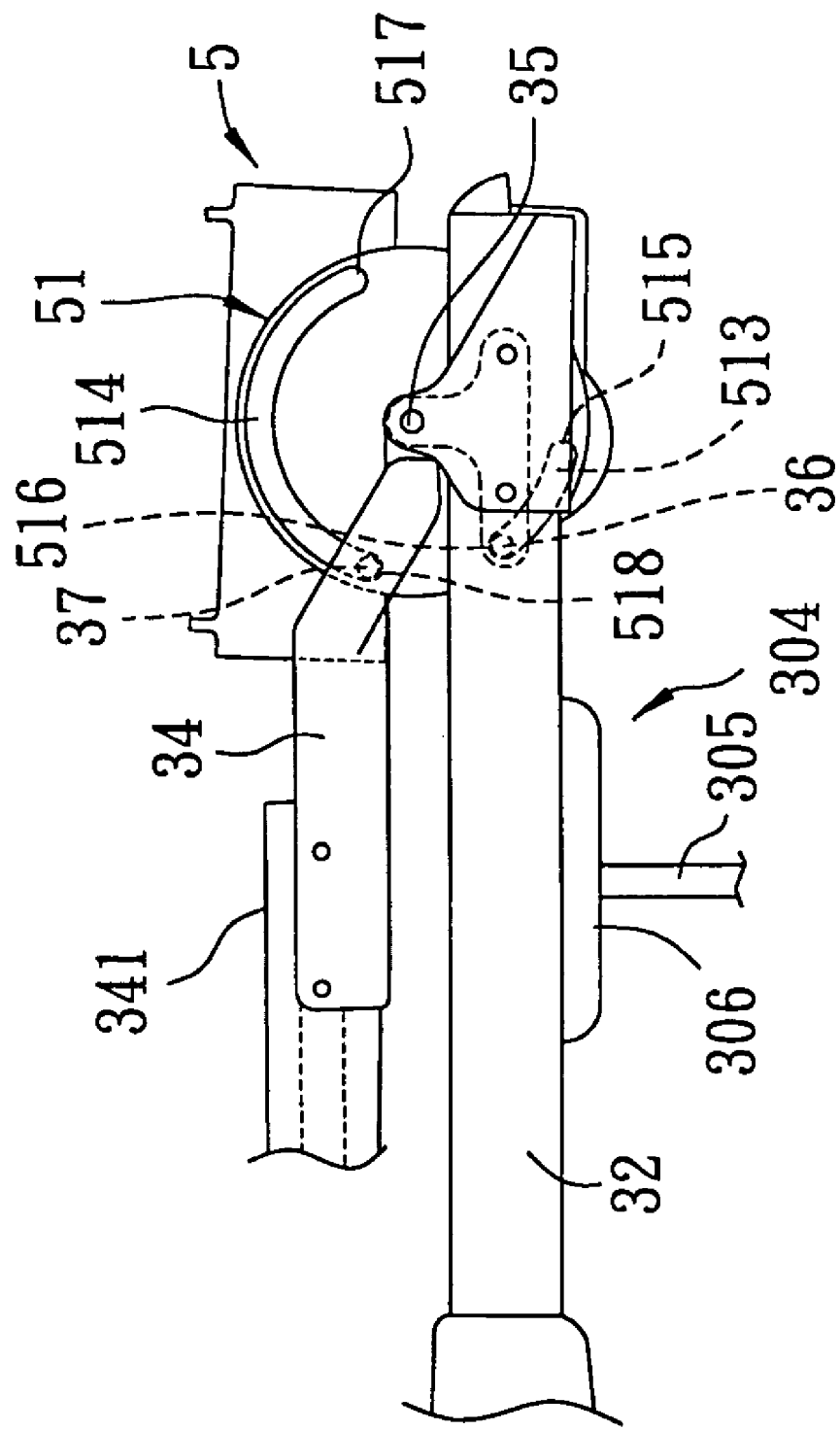
FIG. 6 is a fragmentary schematic view illustrating another state where the upper rod is disposed at a folded position, and the carrier is limited by the studs against rotation in a second direction opposite to the first direction.

On the other hand, referring to FIG. 6, the first stud 36 contacts the second end 516 of the groove-defining wall of the first arcuate groove 513 so as to limit the carrier 5 against rotation relative to the upper and lower rods 341, 32 in the second direction, and the second stud 37 contacts the second end 518 of the groove-defining wall of the second arcuate groove 514 so as to limit the carrier 5 against rotation relative to the upper and lower rods 341, 32 in the first direction when the frame 20 is disposed at a folded state, as best shown in FIG. 6.

Referring again to FIGS. 1 and 3, each of the connecting parts 51 of the carrier 5 is formed with a slot 521 for mounting a carrying element 21 thereon. In this embodiment, the carrying element 21 is in the form of a seat, and is formed with a pair of protrusions 211 (only one side of the carrying element 21 is shown in FIG. 1) that are respectively insertable into the slots 521 in the connecting parts 51.

As for the pivot connection between the upper and lower rods 341, 32, referring again to FIG. 3, each of the lower rods 32 is formed with a pair of lug plates 322, and each of the upper rods 341 is formed with a pivot body 343 that is disposed between the lug plates 322 of the respective one of the lower rods 32. Each of the pivot axles 35 extends through the lug plates 322 of the respective one of the lower rods 32 and the pivot body 343 of the respective one of the upper rods 341.

Referring once more to FIG. 2, the first interlocking member 321 is provided on an upper portion of a respective one of the lower rods 32, and extends toward a respective one of the upper rods 341. The second interlocking members 381 is formed on a lower portion of a respective one of upper rods 341. Each of the locking units further includes a compression spring 382 abutting against the second interlocking member 381 for providing an urging force to push the second interlocking member 381 to move toward the first interlocking members 321 for engagement therebetween, a slide 383 (see FIG. 1) mounted on an upper end of a respective one of the upper rods 341, and an operating cable 382 interconnecting the second interlocking member 381 and the slide 383 such that up-pulling of the operating cable 382 results in disengagement of the second interlocking member 381 from the first interlocking member 321 so as to permit the upper rods 341 to be pivotable about the respective one of the pivot axles 35 as to fold the frame 20.

The frame 20 further comprises a pushing lever 342 interconnecting the upper ends of the upper rods 341, and cooperating with the upper rods 341 to form a pushing element 34 for pushing or pulling the stroller.

The frame 20 further includes an undercarriage 31 and a pair of pivot rods 33, each of which pivotally connects a lower end of a respective one of the lower rods 32 to the undercarriage 31. Preferably, in this embodiment, the frame 20 further includes a strut mechanism 30 mounted between the undercarriage 31 and the lower rods 32 so as to permit the lower rods 32 to stay in an extended state as shown in FIG. 1. The strut mechanism 30 includes a pair of torsion springs 301, each of which is mounted on a respective one of the pivot rods 33 for providing an urging force to urge the corresponding one of the lower rods 32 to be disposed in the extended state, a pair of up-pushing cylinders 302 mounted between the lower rods 32 and the undercarriage 31, a strut assembly 303 mounted between the lower rods 32 and the undercarriage 31 for supporting the lower rods 32, and an interlocking unit 304. The interlocking unit 304 includes an engaging hook 305 mounted on the undercarriage 31, and an engaging base 306 mounted on one of the lower rods 32 and engageabale with the engaging hook 305 so as to prevent undesired movement of the lower rods 32 relative to the undercarriage 31 when the frame 20 is disposed at the folded state shown in FIG. 6.

Figure 4:
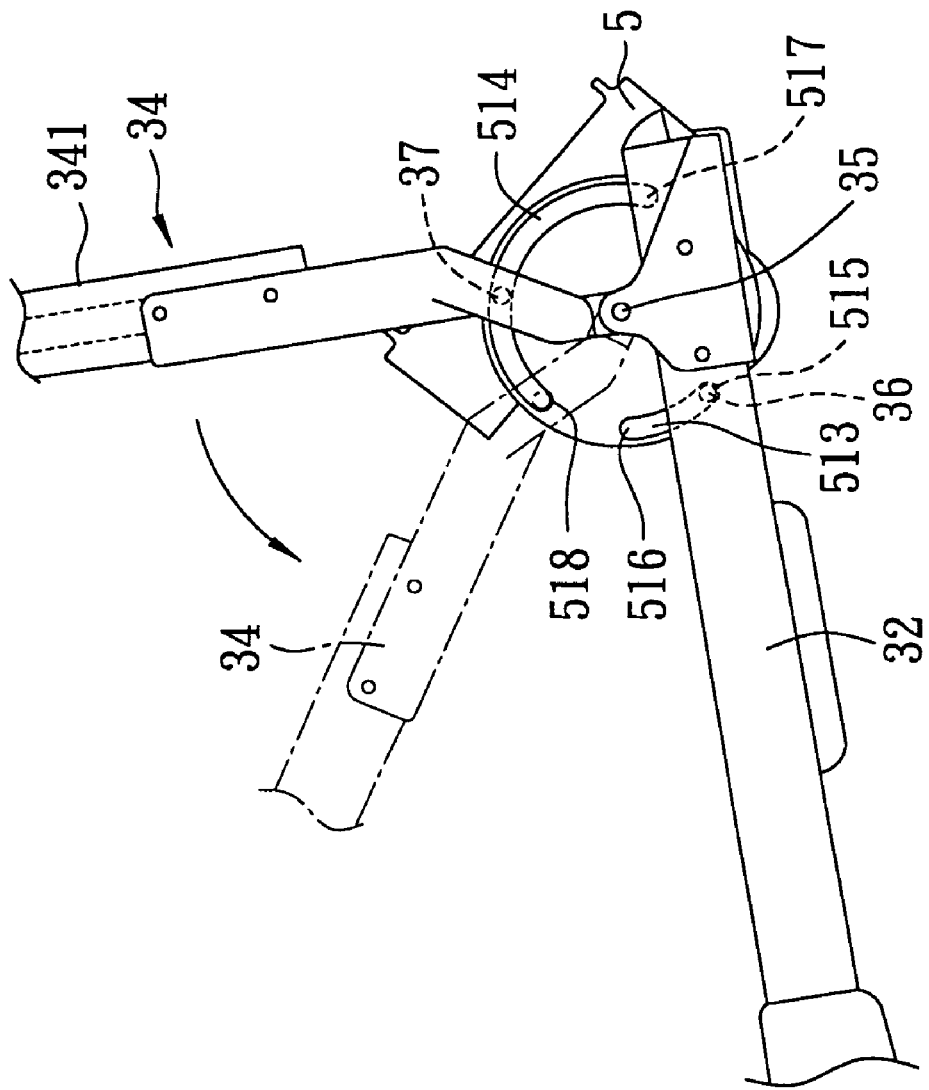
FIG. 4 is a fragmentary schematic view illustrating how the upper rod of the preferred embodiment is folded from the state shown in FIG. 2.
Figure 5:
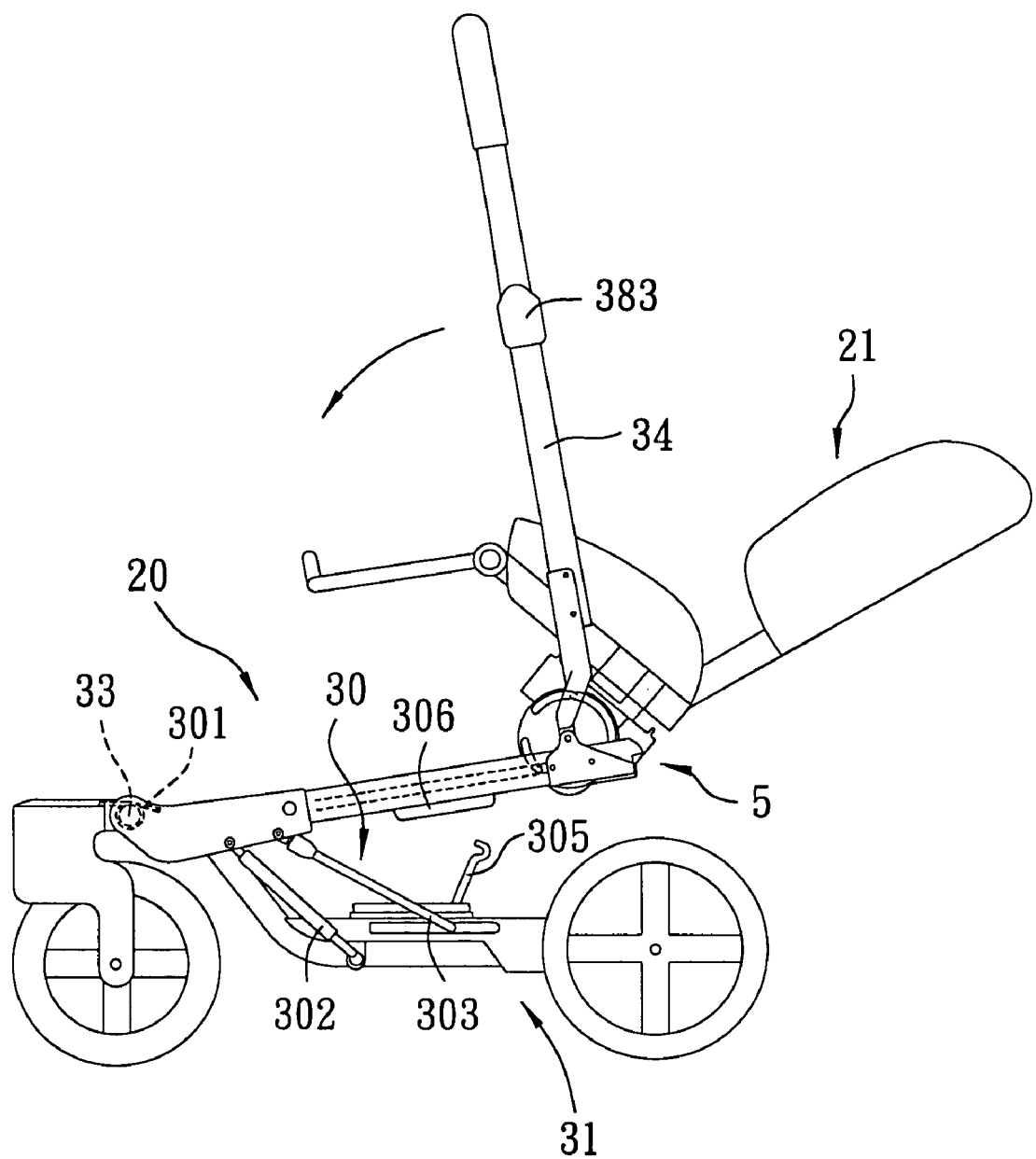
FIG. 5 is a schematic view illustrating how the carrier of the preferred embodiment together with the seat can be moved during folding of the upper rod.

To move the frame 20 from the extended state shown in FIG. 1 to the folded state shown in FIG. 3, the slide 383 is pulled upwardly to disengage the second interlocking member 381 from the first interlocking member 321, and the pushing element 34 is subsequently pushed to pivot frontwardly about the pivot axles 35. At the same time, the strut assembly 303 is driven to pivot relative to the lower rods 32 and the undercarriage 31, and the second stud 37 of each limiting unit is moved from the first end 517 of the groove-defining wall of the corresponding second arcuate groove 514 toward the second end 518 of the groove-defining wall of the corresponding second arcuate groove 514. The connecting parts 51 of the carrier 5 remain stationary until the second studs 37 reach the second ends 518 of the groove-defining walls of the second arcuate grooves 514 (see FIG. 4), are driven by the second studs 37 to pivot about the respective pivot axles 35 when the second studs 37 move further along with the frontward movement of the upper rods 341, and are stopped from moving when the second ends 516 of the groove-defining walls of the first arcuate grooves 513 reach the first studs 36, thereby disposing the frame 20 at the folded position. At the same time, the lower rods 32 are moved from an inclined position toward a horizontal position relative to the undercarriage 31 during frontward movement of the pushing element 34. Note that, in this embodiment, the carrier 5 is disposed parallel to the undercarriage 31 when the frame 20 is disposed at the folded position. However, it can be modified so as to be disposed at a desired angle relative to the undercarriage 31 according to practical requirements. The engaging hook 305 immediately engages the engaging base 306 when the second ends 516 of the groove-defining walls of the first arcuate grooves 513 reach the first studs 36. Moreover, the torsion springs 301 accumulate an urging force for providing an upward force against the lower rods 32 when the frame 20 is disposed at the folded position.

When it is desired to restore the frame 20 to the extended position, the pushing element 34 is pulled upwardly, and the engaging hook 305 is disengaged from the engaging base 306. At this time, the second studs 37 are moved from the second ends 518 of the groove-defining walls of the second arcuate grooves 514 toward the first ends 517 of the groove-defining walls of the second arcuate grooves 514. The carrier 5 is then driven by the second studs 37 to pivot about the pivot axles 35 when the second studs 37 reach the first ends 517 of the groove-defining walls of the second arcuate grooves 514, and is stopped from moving by the first studs 36 when the first ends 515 of the groove-defining walls of the first arcuate grooves 513 reach the first studs 36, thereby disposing the frame 20 at the extended position. At the same time, the lower rods 32 are urged by the torsion springs 301 to move to the inclined position relative to the undercarriage 31.

With the inclusion of the limiting units (36, 37) and the first and second arcuate grooves 513, 514 in the foldable stroller of this invention, the aforesaid drawbacks associated with the conventional stroller can be eliminated.

While the present invention has been described in connection with what is considered the most practical and preferred embodiment, it is understood that this invention is not limited to the disclosed embodiments but is intended to cover various arrangement included within the spirit and scope of the broadest interpretation so as to encompass all such modifications and equivalent arrangements.

What is claimed is:

1. A foldable stroller comprising:
a wheeled foldable frame having a pair of pivot axles, a pair of opposite lower rods, and a pair of opposite upper rods that are pivoted to said lower rods through said pivot axles, respectively, so as to permit folding of said frame;
a pair of locking units, each of which includes first and second interlocking members that are provided on said frame and that are releasably engageable with each other so as to lock said upper rods against rotation relative to said lower rods;
a carrier disposed between said pivot axles and including a pair of opposite connecting parts that are pivoted to said frame through said pivot axles, respectively, each of said connecting parts being formed with first and second arcuate grooves having a respective curvature center coincident with a respective one of said pivot axles; and
a pair of limiting units, each of which includes first and second studs that project respectively from a respective one of said lower rods and a respective one of said upper rods into said first and second arcuate grooves of a respective one of said connecting parts.

2. The foldable stroller as claimed in claim 1, wherein each of said first and second arcuate grooves is defined by a groove-defining wall that has opposite first and second ends, said first stud contacting said first end of said groove-defining wall of said first arcuate groove so as to limit said carrier against rotation relative to said upper and lower rods in a first direction, and said second stud contacting said first end of said groove-defining wall of said second arcuate groove so as to limit said carrier against rotation relative to said upper and lower rods in a second direction opposite to the first direction when said frame is disposed at an extended state.

3. The foldable stroller as claimed in claim 2, wherein said first stud contacts said second end of said groove-defining wall of said first arcuate groove so as to limit said carrier against rotation relative to said upper and lower rods in the second direction, and said second stud contacts said second end of said groove-defining wall of said second arcuate groove so as to limit said carrier against rotation relative to said upper and lower rods in the first direction when said frame is disposed at a folded state.

4. The foldable stroller as claimed in claim 3, wherein each of said connecting parts of said carrier is formed with a slot, said carrier further including a carrying element that is formed with a pair of protrusions that are respectively insertable into said slots in said connecting parts.

5. The foldable stroller as claimed in claim 3, wherein each of said lower rods is formed with a pair of lug plates, each of said upper rods being formed with a pivot body that is disposed between said lug plates of the respective one of said lower rods, each of said pivot axles extending through said lug plates of the respective one of said lower rods and said pivot body of the respective one of said upper rods.

* * * * *